United States Patent
Kräuter

(10) Patent No.: US 6,446,449 B2
(45) Date of Patent: Sep. 10, 2002

(54) COOLING INSTALLATION

(75) Inventor: Thomas Kräuter, Braunfels (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/756,482

(22) Filed: Jan. 8, 2001

(30) Foreign Application Priority Data

Jan. 7, 2000 (DE) .......................................... 100 00 331

(51) Int. Cl.$^7$ .............................................. F25D 17/02
(52) U.S. Cl. ........................................ 62/201; 62/434
(58) Field of Search .......................... 62/201, 185, 434, 62/430

(56) References Cited

U.S. PATENT DOCUMENTS

| | | | |
|---|---|---|---|
| 3,729,064 A | | 4/1973 | Wolf et al. |
| 4,850,201 A | * | 7/1989 | Oswalt et al. ............... 62/185 |
| 5,197,537 A | * | 3/1993 | Chigara et al. .............. 165/32 |
| 5,363,668 A | * | 11/1994 | Nakao et al. ................ 62/141 |
| 5,476,137 A | * | 12/1995 | Ochiai et al. ............... 165/30 |
| 5,491,982 A | * | 2/1996 | Gowens ....................... 62/434 |
| 5,575,159 A | * | 11/1996 | Dittell ........................ 62/199 |
| 6,233,955 B1 | * | 5/2001 | Egara ......................... 62/194.4 |

FOREIGN PATENT DOCUMENTS

DE 19 32 895 1/1971

* cited by examiner

*Primary Examiner*—William C. Doerrler
(74) *Attorney, Agent, or Firm*—Pauley Petersen Kinne & Erickson

(57) ABSTRACT

A cooling installation for a machine tool or the like, having a circulation system in which coolant circulates, wherein the coolant is conducted to a tempering device of the machine tool, wherein a metering unit is assigned to the circulation system, by which an external coolant can be metered to the coolant circulating in the circulation system, and wherein the metering unit can be controlled by a control device. In order to set the best possible constant temperature level at the tempering device, the circulation system has a buffer tank through which the coolant is conducted, and the metering unit meters the external coolant into the return flow coming from the tempering device and into the circulation system upstream of the buffer tank.

17 Claims, 1 Drawing Sheet

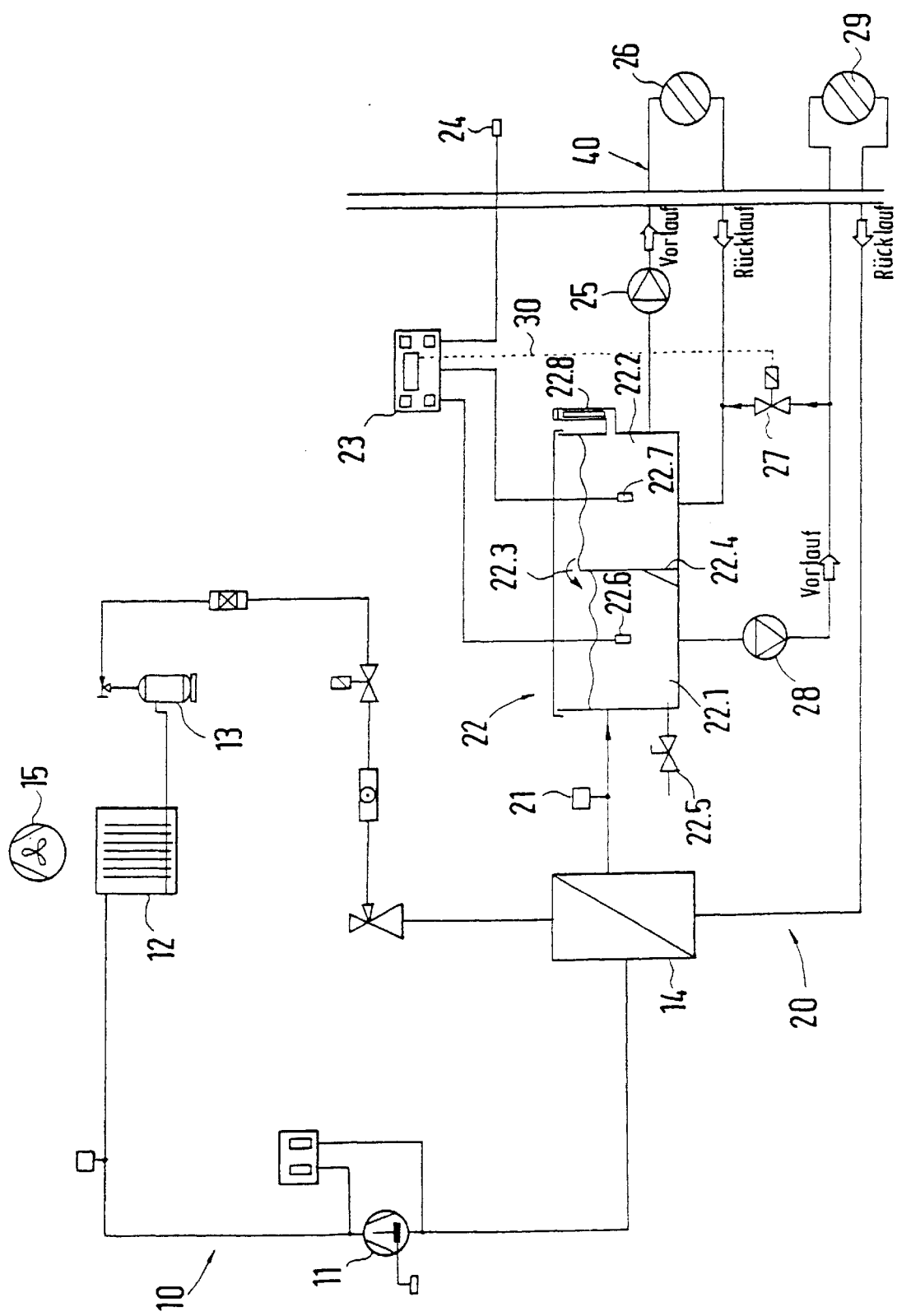

COOLING INSTALLATION

BACKGROUND OF THE INVENTION

1. Field of the Invention

This invention relates to a cooling installation for a machine tool or the like, having a circulation system in which coolant circulates, wherein the coolant is conducted to a tempering device of the machine tool, wherein a metering unit is assigned to the circulation system, by which an external coolant can be metered to the coolant circulating in the circulation system, and wherein the metering unit can be controlled by a control device.

2. Description of Related Art

Such cooling installations are used, for example, to cool machine beds of precision lathes or precision milling machines. With the tempering device, the machine bed is maintained at a temperature which corresponds to the ambient temperature. In this case the deviation of the temperature in the tempering device from the ambient temperature is only allowed to be very small, preferably the deviation may be 2/10 to 3/10 of a degree Celsius. At present, a circulation system in which coolant circulates is used in connection with such cooling installations. In this case the temperature of the coolant is selected so that the ambient temperature is reached in the tempering device. If the temperature in the circulation system reaches an impermissibly high value, the control device detects this situation. Thus the control device controls the metering unit, for which purpose external cooling medium is metered into the inflow, for example upstream of the machine tool, of the circulation system. In this case the external coolant has a lower temperature than the coolant conducted in the circulation system. A brief intense fall below the temperature in the inflow is caused with this type of cooling, which causes a sudden temperature drop in the tempering device.

SUMMARY OF THE INVENTION

It is one object of this invention to provide a cooling installation of the type mentioned above for maintaining a constant temperature level in the tempering device.

This object is achieved because the circulation system has a buffer tank, through which the coolant is conducted, and the metering unit meters the external coolant into the return flow coming from the tempering device and into the circulation system upstream of the buffer tank.

If the temperature level in the circulation system is detected as impermissibly exceeded, the cold external coolant is metered into the return flow and thereafter can be mixed in the buffer tank with the coolant conducted in the return flow, because of which an even temperature level is generated. A sudden temperature drop in the tempering device thus can be dependably prevented.

In one preferred embodiment of this invention, the cooling installation has a refrigeration circuit with an evaporator connected to a cooling circuit, into which the external coolant is conducted. A connection between the cooling circuit and the circulation system can be made with the metering unit. With the refrigeration circuit there is always sufficient external coolant available at the metering unit.

To provide a self-sufficient system, which is closed in itself, in one embodiment of this invention, a partial tank is assigned to the buffer tank, wherein the buffer tank is connected with the partial tank via an overflow device, and a cooling circuit, which is connected with the circulation system via the metering unit, extends through the partial tank. When using a refrigeration circuit for cooling the external coolant, the temperature of the external coolant in the cooling circuit is monitored with a temperature sensor. The temperature sensor is a component of a control circuit, which activates the compressor of the refrigeration circuit when the temperature falls below a reference variable and shuts it off when a predetermined value is exceeded. An energy-saving operation is effected through this control circuit.

The circulation system preferably has a heat exchanger, by which a consumer can be cooled. A machine control can be used as a consumer, for example, which in the end is used for controlling the machine tool to be cooled. Thus the complete cooling of the entire machine tool is provided because of a single cooling installation.

In one preferred embodiment of this invention, an ambient temperature sensor, which is assigned to the tempering device, and a buffer tank temperature sensor, which is arranged in the coolant of the buffer tank, are connected to the control device. The control device has a control circuit which forms a differential temperature between the ambient temperature sensor and the buffer temperature sensor and controls the metering unit as a function of the differential value obtained. In this case the ambient temperature sensor can be arranged in such a way that it is placed in the immediate vicinity of the tempering device and measures the temperature of the surrounding ambient air.

The metering unit is preferably designed as a solenoid valve, which can be opened or closed, clocked by the control device.

To reduce the parts cost, the buffer tank and the partial tank are formed by a common tank and are separated from each other by a bulkhead, wherein the bulkhead forms an overflow device.

For reducing the parts cost the control device should be used to set the temperature of the external coolant to a lower temperature than the temperature of the coolant present in the circulation system.

In another embodiment of this invention, the flow in the cooling circuit is monitored by a flow monitor for reasons of operational dependability.

BRIEF DESCRIPTION OF THE DRAWINGS

This invention will be explained in greater detail in view of preferred embodiments shown in the drawings, wherein:

The single drawing FIGURE represents a diagrammatic plan of a cooling installation, according to one preferred embodiment of this invention.

DESCRIPTION OF PREFERRED EMBODIMENTS

The cooling installation essentially comprises three circuits. One is a refrigeration circuit 10, another is a cooling circuit 20, and a third is a circulation system 40.

The refrigeration circuit 10 has customary components, for example a compressor 11, a condenser 12, a collector 13, an evaporator 14 and a ventilator 15. The mode of operation of such a refrigeration circuit is generally known, so that it need not be explained in detail in this specification. The refrigeration circuit is connected with the cooling circuit 20 via the evaporator 14. Thus, the cooling energy generated in the refrigeration circuit 10 is transferred via the evaporator 14 to the coolant circulating in the cooling circuit 20. This coolant is referred to as the external coolant. Starting at the evaporator 14, the external coolant flows passes a flow monitor 21, which permanently monitors the flow in the cooling circuit 20. Following the flow monitor 21, the external coolant reaches a partial tank 22.1 of a reservoir 22. The reservoir 22 is preferably designed as a plastic tank. After the partial tank 22.1, the external coolant is pumped by means of a pump 28 into an inlet and supplied to a consumer 29. In one embodiment, the consumer 29 is a precision milling machine. The cooling output made available by the cooling circuit is needed here in the control circuit of the machine tool. After the consumer 29, the external coolant flows back to the evaporator via the return flow, so that the cooling circuit 20 is closed. Besides the partial tank 22.1, the reservoir 22 also has a buffer tank 22.2. To form the partial tank 22.1 and the buffer tank 22.2, the reservoir 22 is divided into two partial chambers by means of a bulkhead 22.4. The bulkhead 22.4 is dimensioned so that it forms an overflow device 22.3 between the partial tank 22.1 and the buffer tank 22.2. A filler fitting 22.8 is used for filling the reservoir. When the reservoir 22 is to be emptied, an outlet valve 22.5 is used.

The circulation system 40 mentioned above extends through the buffer tank 22.2. Starting at the buffer tank 22.2, the coolant stored in the buffer tank 22.2 is fed into an inlet by means of a pump 25. The coolant flows through this inlet to a tempering device of the above mentioned machine tool. In this case the tempering device can be assigned to the machine bed of the machine tool. It is used to maintain the machine bed exactly at the level of the ambient temperature. After the tempering device 26, the coolant again moves via the return flow to the buffer tank 22.2. Thus, the circulation system 40 is closed.

A metering unit 27 in the form of a solenoid valve is installed between the cooling circuit 20 and the circulation system 40. The metering unit 27 connects the inflow of the cooling circuit 20 with the return flow of the circulation system.

The cooling installation also has a control device 23, which performs various functions. For one, it is used to perform a differential value temperature control. This differential value temperature control would be performed using a buffer tank temperature sensor 22.7 and an ambient temperature sensor 24. In this case, the buffer tank temperature sensor 22.7 is arranged in the coolant of the buffer tank 22.2. The ambient temperature sensor 24 is assigned to the machine tool. The control device 23 forms the temperature difference between these two temperature sensors 22.7 and 24. If the formed difference exceeds a reference variable, the metering unit 27 is triggered via a control line 30. The control pulse emitted during this causes the metering unit 27 to open a spatial connection between the cooling circuit 20 and the circulation system 40. In this case external coolant from the cooling circuit 20 enters into the return flow of the circulation system 40. Together with the coolant of the circulation system 40, the external coolant metered in is conveyed into the buffer tank 22.2. There, the two coolants can intermix and produce a temperature compensation between each other. Because a temperature compensation occurs in the buffer tank 22.2, it is possible to achieve continuous cooling of the tempering device 26. When the measurement of the differential temperature shows that the measured differential temperature is below the reference variable, the metering unit 27 closes.

So that the refrigeration circuit 10 need not be maintained in a continuous operating state, the control device 23 is connected via a control line, not represented in the drawing, with the compressor 11. A fixed value regulation is performed, making use of a temperature sensor 22.6 arranged in the external coolant of the partial tank 22.2. In the process, the temperature of the external coolant is measured and compared with a reference variable. If the reference variable is exceeded, the compressor 11 is switched on by the control device 23. The refrigeration circuit 10 then cools until the temperature at the temperature sensor 22.6 again falls below a predetermined value.

What is claimed is:

1. In a cooling installation for a machine tool having a circulation system in which a coolant circulates, wherein the coolant is conducted to a tempering device of the machine tool, wherein a metering unit is assigned to the circulation system for metering an external coolant to the coolant circulating in the circulation system, and wherein the metering unit is controlled by a control device, the improvement comprising:

the circulation system (40) having a reservoir (22) formed by a partial tank (22.1) and a buffer tank (22.2), the coolant conducted into the buffer tank (22.2), the metering unit (27) metering the external coolant into a return flow from the tempering device (26) and into the circulation system (40) upstream of the buffer tank (22.2), and the metering unit (27) controlling the return flow as a function of a temperature difference between a first temperature of the coolant in the buffer tank (22.2) and a second temperature at the tempering device (26).

2. In the cooling installation in accordance with claim 1, wherein the cooling installation has a refrigeration circuit (10) with an evaporator (14) coupled to a cooling circuit (20), the external coolant is conducted through the evaporator (14), and the metering unit (27) forms a connection between the cooling circuit (20) and the circulation system (40).

3. In the cooling installation in accordance with claim 2, wherein the buffer tank (22.2) is connected with a partial tank (22.1) via an overflow device (22.3), and the cooling circuit (20) passes through the partial tank (22.1).

4. In the cooling installation in accordance with claim 2, wherein a temperature of the external coolant in the cooling circuit (20) is monitored by a temperature sensor (22.6), and the temperature sensor (22.6) is a component of a control circuit which activates the compressor (11) of the refrigeration circuit (10) when the temperature of the external coolant falls below a reference variable, and deactivates the compressor (11) when a predetermined value is exceeded.

5. In the cooling installation in accordance with claim 4, wherein the cooling circuit (20) has a heat exchanger for cooling a consumer (29).

6. In the cooling installation in accordance with claim 5, wherein an ambient temperature sensor (24) is assigned to the tempering device (26) and a buffer temperature sensor (22.7) positioned in the coolant of the buffer tank (22.2) are connected to the control device (23), and the control device (23) has a control circuit which forms a differential temperature between the ambient temperature sensor (24) and the buffer temperature sensor (22.7) and controls the metering unit (27) as a function of the differential temperature.

7. In the cooling installation in accordance with claim 6, wherein the metering unit (27) is a solenoid valve.

8. In the cooling installation in accordance with claim 7, wherein the buffer tank (22.2) and the partial tank (22.1) are formed by a common tank and are separated from each other by a bulkhead (22.4) which forms the overflow device (22.3).

9. In the cooling installation in accordance with claim 7, wherein the control device (23) sets a value for the temperature sensor (22.6) of the external coolant to a lower temperature than a temperature of the coolant present in the circulation system (40).

10. In the cooling installation in accordance with claim 9, wherein a flow in the cooling circuit (20) is monitored by a flow monitor (21).

11. In a cooling installation for a machine tool having a circulation system in which a coolant circulates, wherein the coolant is conducted to a tempering device of the machine tool, wherein a metering unit is assigned to the circulation system for metering an external coolant to the coolant circulating in the circulation system, and wherein the metering unit is controlled by a control device, the improvement comprising:

the circulation system (40) having a buffer tank (22.2), through which the coolant is conducted, and the metering unit (27) metering the external coolant into a return flow from the tempering device (26) and into the circulation system (40) upstream of the buffer tank (22.2), the buffer tank (22.2) connected with a partial tank (22.1) via a bulkhead (22.4), and a cooling circuit (20) which is connected with the circulation system (40) by the metering unit (27) passing through the partial tank (22.1).

12. In the cooling installation in accordance with claim 1, wherein a cooling circuit (20) connected with the circulation system (40) has a heat exchanger for cooling a consumer (29).

13. In a cooling installation for a machine tool having a circulation system in which a coolant circulates, wherein the coolant is conducted to a tempering device of the machine tool, wherein a metering unit is assigned to the circulation system for metering an external coolant to the coolant circulating in the circulation system, and wherein the metering unit is controlled by a control device, the improvement comprising:

the circulation system (40) having a buffer tank (22.2), through which the coolant is conducted, and the metering unit (27) metering the external coolant into a return flow from the tempering device (26) and into the circulation system (40) upstream of the buffer tank (22.2), an ambient temperature sensor (24) assigned to the tempering device (26) and a buffer temperature sensor (22.7) positioned in the coolant of the buffer tank (22.2) are connected to the control device (23), and the control device (23) having a control circuit which forms a differential temperature between the ambient temperature sensor (24) and the buffer temperature sensor (22.7) and controls the metering unit (27) as a function of the differential temperature.

14. In the cooling installation in accordance with claim 3, wherein the metering unit (27) is a solenoid valve.

15. In the cooling installation in accordance with claim 3, wherein the buffer tank (22.2) and the partial tank (22.1) are formed by a common tank and are separated from each other by a bulkhead (22.4) which forms the overflow device (22.3).

16. In the cooling installation in accordance with claim 3, wherein a control device (23) sets a value for the temperature sensor (22.6) of the external coolant to a lower temperature than a temperature of the coolant present in the circulation system (40).

17. In the cooling installation in accordance with claim 1, wherein a flow in the cooling circuit (20) is monitored by a flow monitor (21).

\* \* \* \* \*